(12) United States Patent
Hurst et al.

(10) Patent No.: US 11,928,638 B2
(45) Date of Patent: Mar. 12, 2024

(54) SYSTEMS AND METHODS FOR MIXED-USE DELIVERY OF PEOPLE AND PACKAGES USING AUTONOMOUS VEHICLES AND MACHINES

(71) Applicant: Agility Robotics, Inc., Tangent, OR (US)

(72) Inventors: Jonathan Hurst, Albany, OR (US); Damion Shelton, Allison Park, PA (US)

(73) Assignee: Agility Robotics, Inc., Tangent, OR (US)

( * ) Notice: Subject to any disclaimer, the term of this patent is extended or adjusted under 35 U.S.C. 154(b) by 17 days.

(21) Appl. No.: 17/609,583

(22) PCT Filed: May 8, 2020

(86) PCT No.: PCT/US2020/032250
§ 371 (c)(1),
(2) Date: Nov. 8, 2021

(87) PCT Pub. No.: WO2020/227694
PCT Pub. Date: Nov. 12, 2020

(65) Prior Publication Data
US 2022/0215336 A1 Jul. 7, 2022

Related U.S. Application Data

(60) Provisional application No. 62/845,194, filed on May 8, 2019, provisional application No. 62/845,220, filed on May 8, 2019.

(51) Int. Cl.
*G06Q 10/0832* (2023.01)
*B60W 60/00* (2020.01)
(Continued)

(52) U.S. Cl.
CPC ... *G06Q 10/0832* (2013.01); *B60W 60/00253* (2020.02); *B60W 60/00256* (2020.02);
(Continued)

(58) Field of Classification Search
CPC ........ G06Q 10/0832; B60W 60/00253; B60W 60/00256
(Continued)

(56) References Cited

U.S. PATENT DOCUMENTS 9,552,564 B1  1/2017  Martenis
10,890,921 B2 * 1/2021  Gillett .................. G05D 1/0088
(Continued)

FOREIGN PATENT DOCUMENTS

WO    2017178899 A2    10/2017
WO    2019009937 A1    1/2019

OTHER PUBLICATIONS

"The Clumsy Quest to Perfect the Walking Robot," by John Pavlus, Jul. 1, 2016 (Year: 2016).*
(Continued)

*Primary Examiner* — Omar Zeroual
*Assistant Examiner* — Brian Adams Heflin

(57) ABSTRACT

People and packages are delivered to and picked up from delivery locations by autonomous vehicles that also carry autonomous robots. When a package needs to be picked up or delivered at a particular location, an autonomous robot is deployed from the delivery vehicle and takes the package to the doorstep or other predetermined location or picks up the package from that location and brings it back to the delivery vehicle. After this pickup or delivery, the autonomous robot stows itself back in the delivery vehicle.

26 Claims, 5 Drawing Sheets

(51) Int. Cl.
*B62D 57/032* (2006.01)
*G05D 1/00* (2006.01)
*G05D 1/02* (2020.01)
*G06Q 10/047* (2023.01)

(52) U.S. Cl.
CPC ......... *B62D 57/032* (2013.01); *G05D 1/0287* (2013.01); *G06Q 10/047* (2013.01); *B60W 2540/047* (2020.02); *G05D 2201/0213* (2013.01); *G05D 2201/0217* (2013.01)

(58) Field of Classification Search
USPC ....................................................... 705/332
See application file for complete search history.

(56) References Cited

U.S. PATENT DOCUMENTS

| | | | |
|---|---|---|---|
| 2014/0254896 A1 | 9/2014 | Zhou | |
| 2015/0006005 A1* | 1/2015 | Yu | G06Q 50/28 701/22 |
| 2016/0200438 A1* | 7/2016 | Bokeno | B64F 1/362 244/2 |
| 2016/0364823 A1* | 12/2016 | Cao | G01C 21/3438 |
| 2017/0103490 A1* | 4/2017 | Haparnas | H04W 4/023 |
| 2018/0356823 A1* | 12/2018 | Cooper | G08G 5/0013 |
| 2019/0064847 A1 | 2/2019 | Ferguson | |
| 2019/0114564 A1* | 4/2019 | Ferguson | G06Q 10/06312 |
| 2019/0161190 A1* | 5/2019 | Gil | B65G 1/0435 |
| 2020/0017210 A1* | 1/2020 | Neubecker | E05F 15/70 |
| 2020/0249698 A1* | 8/2020 | Lu | G05D 1/0088 |
| 2020/0265382 A1* | 8/2020 | Tsuruta | G06Q 10/08355 |
| 2021/0209543 A1* | 7/2021 | Scott | B60R 11/04 |
| 2021/0295242 A1* | 9/2021 | Rathi | G06Q 10/083 |
| 2022/0348427 A1* | 11/2022 | Bell | B62D 33/02 |

OTHER PUBLICATIONS

"Boston Dynamics Atlas Robot Does a Backflip in Absolutely Incredible Demo," by Jay Bennett, Nov. 16, 2017 (Year: 2017).*

"SoftBank's purchase of Boston Dynamics could bring walking robots into the home," by Amit Katwala, Jun. 12, 2017 (Year: 2017).*

"Ford's delivery robot walks like a human," by Matt McFarland, May 22, 2019 (Year: 2019).*

"A Smart Little Robot That Can Help Make Deliveries," by Ford, Aug. 5, 2020 (Year: 2020).*

International Search Report in PCT/US2020/032250, dated Jul. 29, 2020.

* cited by examiner

SYSTEMS AND METHODS FOR MIXED-USE DELIVERY OF PEOPLE AND PACKAGES USING AUTONOMOUS VEHICLES AND MACHINES

CROSS-REFERENCE TO RELATED APPLICATIONS

This is an international application that claims the benefit of U.S. Provisional Patent Application No. 62/845,194, filed May 8, 2019 and U.S. Provisional Patent Application No. 62/845,220, also filed May 8, 2019, both of which are incorporated by reference herein in their entirety.

BACKGROUND OF THE INVENTION

The present invention relates generally to systems and methods to conduct local or city-wide pickup and delivery of packages or other items using autonomous vehicles and machines. In certain embodiments it is also contemplated that the systems and methods disclosed herein are configured to be mixed use wherein a single vehicle can accommodate both package delivery and passenger transit simultaneously.

In today's world, packages that are to be delivered long distances are picked up from the sender's house or office by a carrier, dropped at a collection point controlled by the carrier or otherwise delivered to a sorting facility generally located near the collection point. After being indexed or otherwise catalogued, the packages are transported by airplane, ship, rail or tractor-trailer truck from the sorting facility to another such facility at a location much closer to the ultimate destination of the package. Once there, the packages are sorted into smaller groups based on destination location and are ultimately placed on a manned delivery vehicle for actual delivery.

While the sorting process employs an automated process that is well-established and efficient, what is less well-established and less efficient is the so-called "last-mile logistics" involving pickup and delivery between the sorting facilities and the destination of the package. While sophisticated route planning algorithms are used to optimize the delivery or, in some cases, the pickup route, there are still many inefficiencies in the manner in which the package is dropped off or picked up. Human beings, who sometimes get lost, injured, sick or disinterested, and must work limited hours, are needed to drive the truck to the pickup or destination address and carry the correct package to or from the doorstep. The cost of hiring people is high compared to the cost of the other required infrastructure, and this cost limits the ability of home delivery to become more common and widespread than it is currently. Moreover, in times of pandemic, it is advantageous to minimize human involvement in package handling as much as possible.

Like package delivery, people generally take planes, trains, or buses (the human equivalent of the tractor trailer in this example) when traversing longer distances. For travel within the geographical area of a single city, however, most people ride in an automobile, whether it be their own, that of a friend, a taxi service, or a commercially available ride-sharing vehicle. In the vast majority of current cases, these trains, buses and autos are operated by a human driver. Autonomous vehicles, however, have been introduced on an experimental basis for passenger conveyance in some areas of the country and will undoubtedly become more commonplace as technology advances and safety is proven.

Package delivery and people delivery, as currently practiced in towns and cities across America, are nearly always siloed in separate ecosystems, which is not an efficient use of vehicle fleets. People require transportation much more during specific hours of the day, when the majority of people are either heading to work or returning home from work; the rest of the time, many vehicles remain inactive and parked. This wastes considerable space. Consider a large company owning tens of thousands of vehicles—where will they be parked at night? It would be much more efficient to also use these vehicles for logistics and package delivery. During off-peak hours for people-moving, these vehicles could remain continuously on the road, delivering packages in between the occasional mid-day human traveler. So-called "dead head" miles are a common problem for ridesharing and taxis services, where they must convey a person to a distant location, then return with no fare; but if equipped to carry and delivery packages as well, the vehicle may stop at any number of nearby distribution centers, pick up some packages, and deliver them on the way back to its home location.

With a fleet of autonomous vehicles on the road, it is clear how they might be loaded at a central facility with packages. However, an impediment to fully automated package delivery is getting the packages from the vehicle to the doorstep. Some autonomous vehicle delivery solutions include sending the customer a message and requesting them to meet the delivery vehicle at the curb to retrieve a heated or cooled item from a compartment. A difficulty created by such a system is that it relies on the recipient to be timely in retrieving their package. If the recipient is delayed in any way in getting their package, the autonomous vehicle creates a traffic issue idling in front of the delivery location or an inefficiency is introduced into the system because the vehicle will have to either wait longer than expected or will need to return to the delivery location a second time for a single package delivery. Still other solutions require the customer to travel to a specific location that may have a locker or other secure holding containment they can access to retrieve their package. Unfortunately, these solutions rely on the customer to undertake some action to prevent delays, making them inefficient and unworkable for most deliveries.

What is needed is a method and system to coordinate the autonomous delivery of both people and packages to their intended destinations and to transport packages from the autonomous vehicle to the doorstep, using existing sidewalks and infrastructure that includes stairs, gates, doors, broken concrete and tree roots, and an environment generally designed for human mobility.

SUMMARY OF THE INVENTION

The present invention is directed to a system and method for delivering people and packages to one or more delivery locations, each delivery location associated with a street address. To accomplish this, a delivery vehicle is provided with one or more deployable robots that, in embodiments, are either autonomous or remotely operated. A delivery route is mapped for all known delivery locations and the vehicle proceeds to an address associated with each delivery location where it either drops off or picks up a passenger or deploys the delivery robot to deliver or pick up one or more packages. In some embodiments, more than one delivery robot is used at the same time. In other embodiments, the delivery route is altered to prioritize human passengers or packages having special delivery time restrictions.

In an embodiment, the delivery robot is configured to identify and remove the package or packages to be delivered from the vehicle. Then, the robot carries the package to the delivery location, which may be predetermined or may be a porch associated with a residence, and places the package at that location, whereupon it then returns to the delivery vehicle and stows itself onboard. Where the robot is picking up a package, the robot deploys from the delivery vehicle and walks to the delivery location where it picks up one or more packages to be delivered and carries them back to the vehicle. Once there, the robot places the package in a storage area in the vehicle and is stowed in the vehicle. The delivery robot can also be configured to load itself with the package or packages prior to deploying from the delivery vehicle.

Where the delivery vehicle is outfitted with sensors, it may communicate delivery location data to the robot including information about any obstacles the robot may encounter between the vehicle and the delivery location. The vehicle also communicates stored information about the identity of the package and the exact physical location it should be placed at the address. Alternatively, similar information is provided if a package is to be picked up at a particular address.

If any new delivery or pickup requests are received, the vehicle can determine whether the new requests can be efficiently accommodated and, if so, the delivery route is updated to include the new request. Once all of the packages and people have been delivered or picked up, the vehicle either ends its work period or idles at a predetermined idling location.

Another embodiment of the present invention is an autonomous system for delivering or picking up one or more of packages and people to one or more delivery locations with a roadway vehicle having a deployable delivery robot disposed on a deployment mechanism. The system is made up of at least a processing module, a memory storage module and a communication network that work together to determine a delivery route for the roadway vehicle, navigate the vehicle to one or more delivery destinations on the delivery route, and send a signal to the delivery robot or the deployment mechanism to deploy from the vehicle if the delivery location is associated with the delivery or pickup of one or more packages.

BRIEF DESCRIPTION OF THE DRAWINGS

The accompanying drawings, which are incorporated in and form a part of the specification, illustrate the embodiments of the invention and together with the written description serve to explain the principles, characteristics, and features of the invention. In the drawings.

Figure 1:
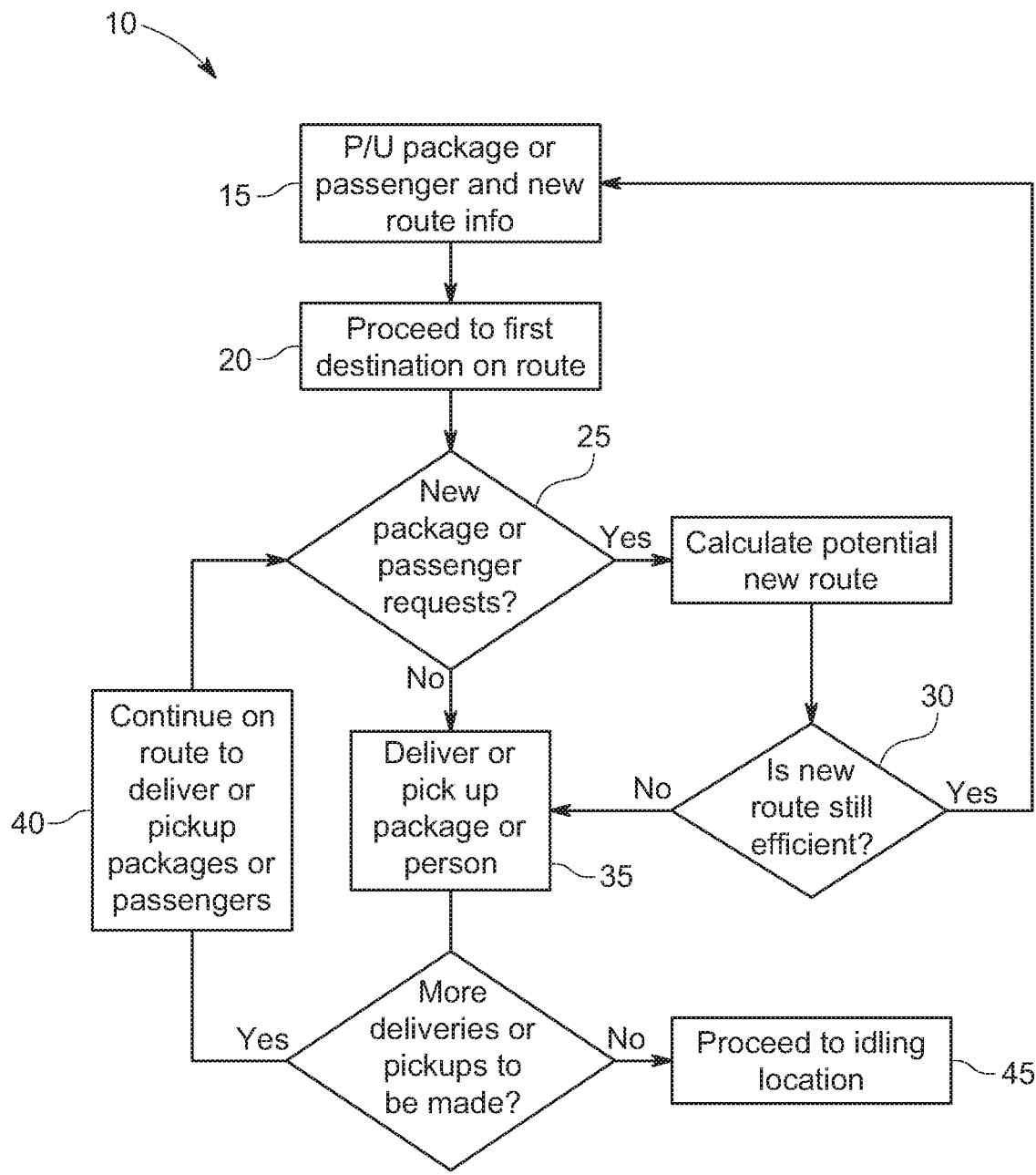
FIG. 1 is a flow chart illustrating one embodiment of the overall mixed use delivery process.

While implementations of the disclosed inventions are described herein by way of example, those skilled in the art will recognize that they are not limited to the embodiments or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are not meant to be used to limit the scope of the description or the claims.

DETAILED DESCRIPTION OF THE INVENTION

In the following description, for purposes of explanation, numerous specific details are set forth in order to provide a thorough understanding of example embodiments. It will be evident to one skilled in the art, however, that embodiments can be practiced without these specific details. In some instances, well-known methods or components have not been described in detail so that the details of the present invention are not obfuscated.

In the interest of clarity, some routine features of the implementations described herein are omitted. It will be appreciated that in the development of any actual implementation of the present invention, certain decisions must be made in order to achieve specific goals, and that different decisions may be made to achieve different goals without departing from the teachings of the invention. While certain implementations might be complex and time-consuming, they would nevertheless be routine to accomplish for those of ordinary skill in the art having the benefit of this disclosure.

The invention set forth herein is intended primarily for use with pickup and delivery of people and packages within the radius of an autonomous delivery vehicle, and in particular, the radius an autonomous delivery vehicle can travel in a given 4 or 8-hour period. In certain embodiments, the present invention addresses the pick-up and delivery of people and packages within a defined area, such as an area less than 100 square miles or an area less than 50 square miles. It is expected that the present invention will be tailored to use in an urban or suburban setting, although other settings are possible where efficiencies can be realized.

In embodiments, the inventive method set forth herein employs a driverless delivery vehicle capable of carrying both passengers and packages, such as a Ford Transit Connect Van modified for full autonomy, or similar vehicle. Currently, there are a large number of third party organizations and companies that are developing vehicles capable of autonomous navigation and operation ("driverless vehicles"), such as Uber ATG, Argo AI, Waymo and others. The present invention is intended to be agnostic with regard to the particular driverless system that is employed, so long as the system has a memory that can save a route for the delivery of packages and can readily re-calculate that route in order to efficiently address changes that may occur during a delivery run.

Certain embodiments of this invention specifically lay out methods and example embodiments for simultaneous mixed-use people-carrying (as in a taxi service) and package delivery. In some embodiments no modification of a standard autonomous vehicle is required, while other embodiments may require extremely minor modification to house a deployment mechanism for a separate "curb to doorstep" delivery vehicle or robot. Embodiments may carry people and packages at the same time, with an on-board "curb to doorstep" autonomous robot, that can deliver packages to a doorstep, mounted in the rear of the vehicle with an automatic door gate. Alternatively, the robot may be mounted in a location adjacent to the side door of the vehicle depending on the specific application, such as for delivery of mail or packages to a mailbox. In still other embodiments, there may be a specialized vehicle designed specifically with a package and robot bay separate from seating for people.

In FIG. 1, an overall process 10 for delivery of a group of packages or people in accordance with certain embodiments of the present invention is described. In embodiments, at the start of a work shift, an autonomous delivery vehicle is loaded with one or more packages, one or more passengers or both. In certain embodiments, this loading occurs at a distribution center or sorting facility. Alternatively, it could occur at an airport or train station. In other embodiments the work shift could begin with a pickup at a residence or workplace. At the time of the pickup or, alternatively, when the request for a pickup has been made, a route calculation system calculates an optimized delivery route for all people or packages to be delivered or picked up 15. Once this has been calculated, the delivery vehicle begins to navigate to the first calculated location 20. In some embodiments, the route calculation will be re-calculated on a continual basis, such as every thirty seconds, to account not only for new stops, but also for changes in traffic conditions or road work. As will be apparent to those of skill in the art, existing third party GPS-enabled navigation software such as Waze or Google Maps can be leveraged to assist with generating the delivery route. Waze is registered trademark of Google LLC of Mountainview, CA.

At any point during the work period, including prior to the delivery vehicle reaching the first location, a new request for pickup and/or delivery can be received by the route calculation system 25. If such a request is received and the route calculation system determines the new delivery stop can be efficiently incorporated into the existing route structure 30, the route will be updated accordingly and the delivery vehicle will navigate to an address associated with the new destination when it is most efficient and proceed as previously described. Alternatively, the route calculation system can be biased to prioritize the pickup and delivery of human passengers over packages in order to minimize travel time for human passengers. Similarly, packages or items that are temperature-sensitive, such as groceries, can also be prioritized.

In the event that no new request is made prior to arrival at the first destination, or in the event it is determined that any such request would not be efficiently incorporated into the existing route, the delivery vehicle proceeds to the address of the original destination for delivery or pick-up 35. If the delivery or pick-up happens to be a package, an autonomous robot is deployed from the delivery vehicle to carry or retrieve the package between the delivery vehicle and the doorstep or other destination as more fully explained with relation to FIG. 2. In certain embodiments, the robot is bipedal and autonomous, with an option for remote teleoperation by a human to handle situations that may be confusing for the robot autonomy. Where the delivery or pickup is of a human being, the delivery vehicle proceeds to the address associated with the pickup or delivery and awaits a signal to proceed, such as via an app or through the use of an on-board vehicle sensor that can determine when a person has entered or exited the vehicle.

After the delivery or pickup is complete 35, a determination is made whether there are additional stops to be made, the vehicle repeats the process discussed 40. If, however, no additional deliveries or pickups are planned, the delivery vehicle travels to an idling location 45, either predetermined or calculated based on current location, until a new delivery request is made 25 or the shift ends. The goal for such a system, however, is the maximum utilization of the fleet infrastructure and 100% service time for the robots and vehicles.

Figure 2:
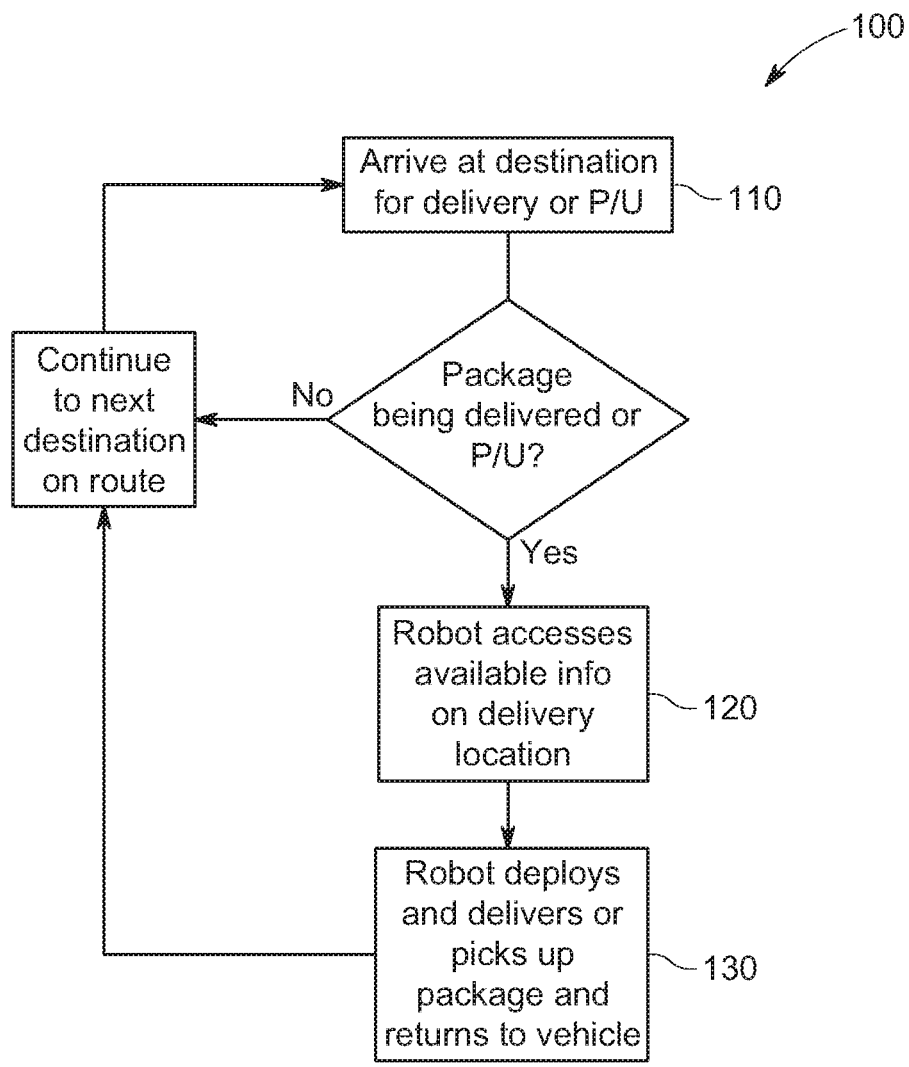
FIG. 2 is a flow chart illustrating one embodiment of the curb to doorstep process.
Figure 3:
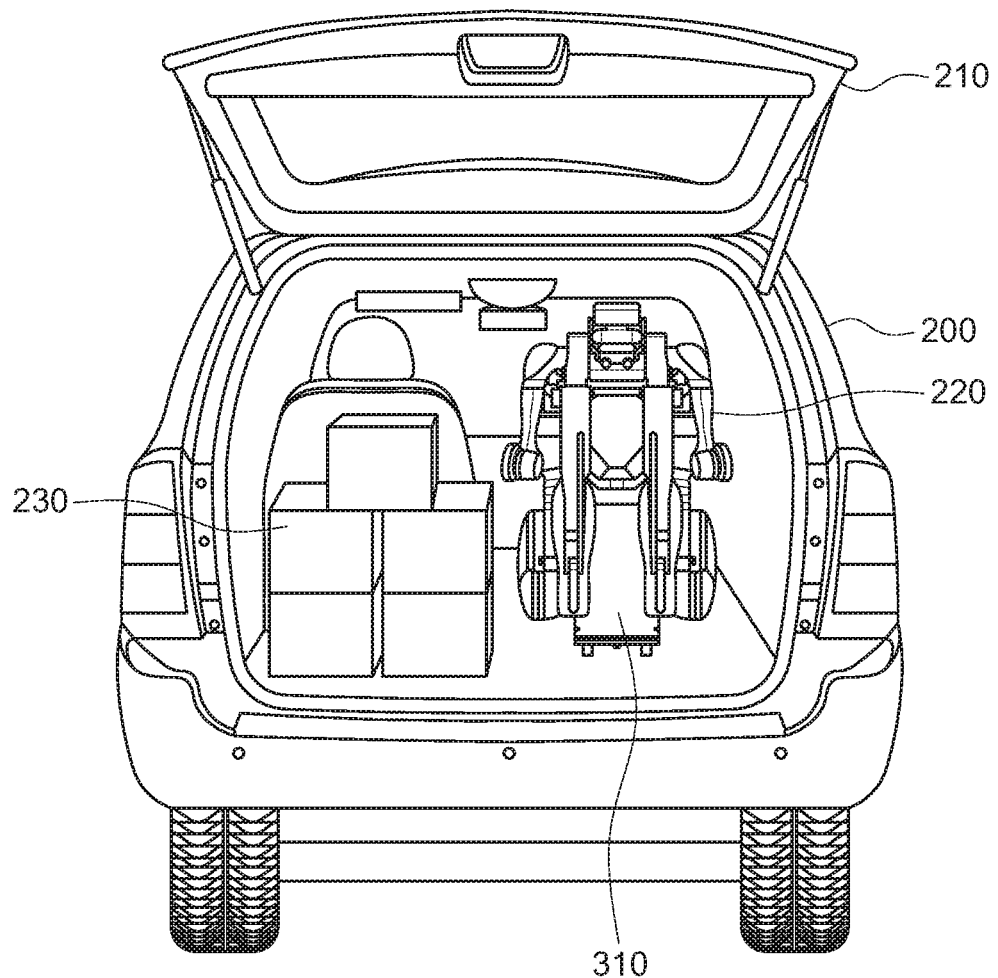
FIG. 3 is an illustration of a delivery van and robot set-up to accomplish the curb to doorstep delivery in accordance with certain embodiments of the invention.

FIG. 2 sets forth an embodiment of a delivery or pickup system and method 100 for packages once the delivery vehicle arrives at the curb 110 having an address and being in front of a destination location in accordance with certain embodiments of the invention. FIG. 3 illustrates a delivery vehicle 200 in accordance with certain embodiments of the present invention. If a package is being picked up or delivered, a door 210 of the delivery vehicle, such as a lift gate in the back of the vehicle 200, is opened to enable egress by an autonomous robot 220. Prior to exiting the vehicle 200, the robot 220 accesses available information about the local surroundings. In certain embodiments, the robot 220 accesses information about the destination including, for example, the address, a picture of the home or office from the street, a previously obtained map of the property, the weather, recipient-submitted information, telemetric or other data collected by the delivery vehicle 200, or other relevant information 120. This information may be provided to the robot 220 via an external data provider or by an electronic control system installed in the delivery vehicle. In certain embodiments, the external data provider is a remote data storage center the robot 220 accesses via a wireless data link.

Next, the robot 220 deploys 130 from the delivery vehicle 200 and retrieves the appropriate package 230 and either carries it to the doorstep of the home or office for delivery or retrieves a package from the doorstep or other predetermined location if the stop is for the purpose of picking up a package. In an alternative embodiment, the robot 220 loads itself with a package 230 prior to deployment. Once the pickup or delivery is complete, the robot reboards the delivery vehicle 200 and the vehicle 200 continues to the next stop. In some embodiments, the vehicle may re-charge the robot when it is on-board, to reduce the required battery life of the robot to only that required to do a single delivery, rather than requiring sufficient charge to operate the robot all day. In embodiments, people who opt for autonomous delivery or pickup will grant permission for the robot to come onto their property and will likely need to generate a detailed map of their yards in advance to assist with delivery.

Figure 4:
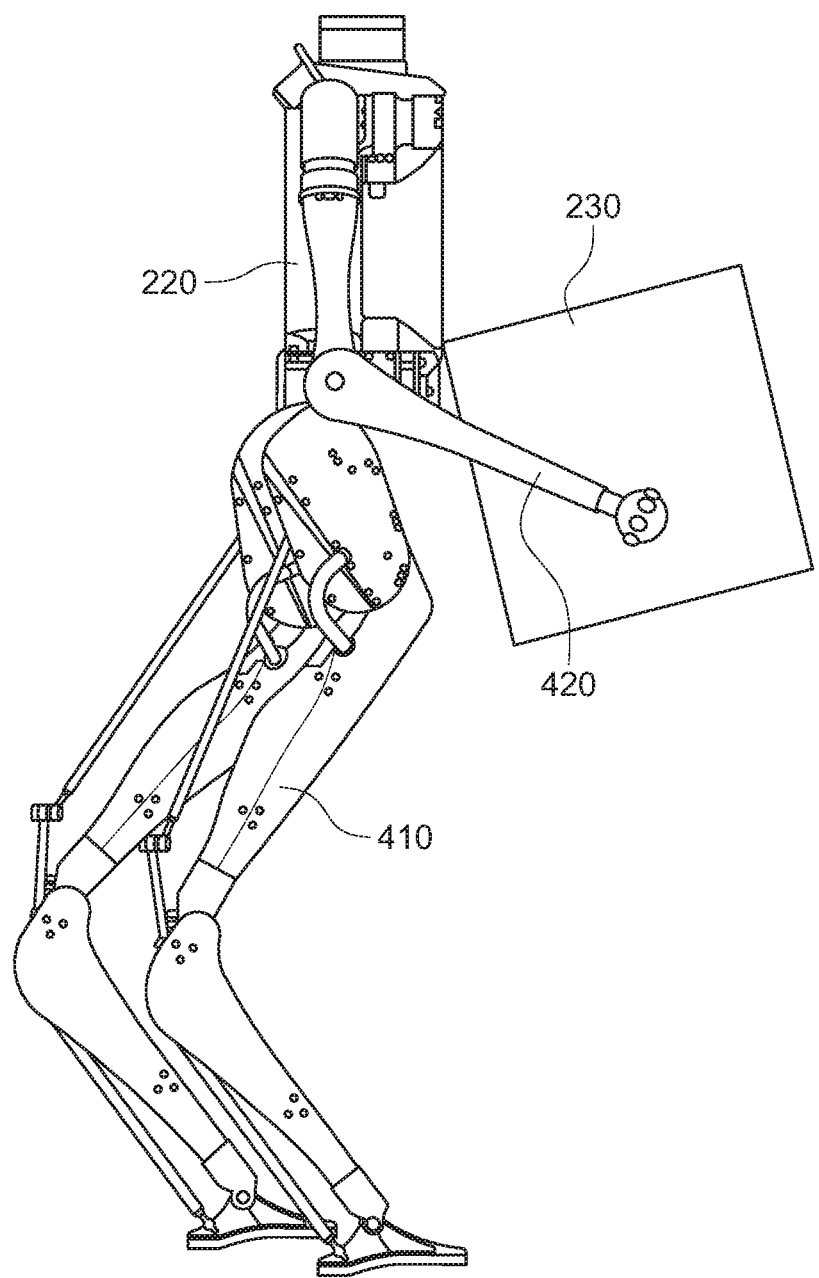
FIG. 4 is an illustration of an autonomous robot for use with the curb to doorstep process described herein.

With reference to FIG. 4, in certain embodiments, the robot 220 is a bi-pedal autonomous robot having legs 410 that enable it to move from place to place in a manner that could be referred to as "walking." The robot 220 further has arms 420 that can be employed to carry the packages 230 referred to above to and from the delivery vehicle 200. The robot 220 can autonomously operate through use of a multitude of on-board sensors, control circuits, motors and springs wherein it can balance both holding and not holding a package and can employ its sensors to avoid obstacles in its path as well as using stored location and mapping data to assist with navigation to and from the vehicle 200.

Figure 5:
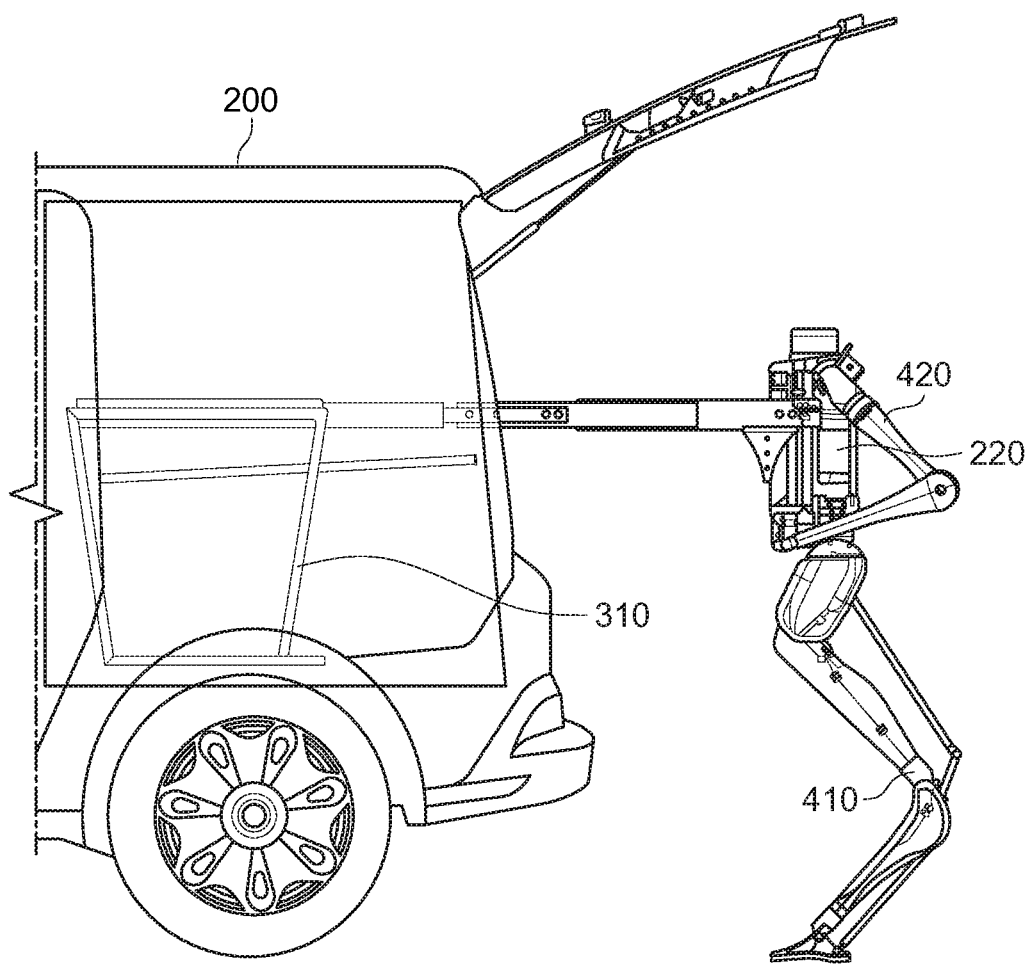
FIG. 5 is an illustration of a deployment mechanism in an extended position with an autonomous robot disposed at the end.

In embodiments, the robot 220 is configured to be transitionable between a stowed configuration as illustrated in FIG. 3, and an operational configuration as illustrated in FIG. 4. When the robot 220 is walking and carrying packages to and from the delivery vehicle 200, it is in operational configuration, but its arms 420 and legs 410 can be folded and positioned to transition to the stowed configuration where it is placed on, or connected to, a deployment mechanism 310 mounted inside the delivery vehicle 200. In embodiments, the deployment mechanism 310 may be permanently installed in the vehicle or may be removable. An embodiment of the deployment mechanism 310 is illustrated in FIG. 5.

In still other embodiments, there may be more than one deployment mechanism 310 and more than one robot 220 deployed from a vehicle 200 at the same time, allowing the vehicle 200 to drop off several robots 220 with brief stops, allow them time to make their deliveries, and pick them up again. The vehicle 200 may pause only momentarily to allow a robot 220 to exit the vehicle 200 with a package 230, to avoid blocking traffic. This problem is especially significant in urban areas, where delivery vehicles often are cited for parking infractions, as they have little other choice but to illegally park while making a delivery.

While the robot 220 is in stowed configuration, the arms 420 can be used to perform tasks that do not require the use of the legs 410. In embodiments, the arms 420 can extend out of the side of the vehicle 200 to place mail or packages in a mailbox or other receptacle without the robot 220 exiting the vehicle 200. In some embodiments, the deployment mechanism 310 used to hold the robot 220 may be actuated to extend the reach of the workspace by moving the stowed robot 220 in a direction that makes accessing an exterior location easier.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, the memory/storage can be transitory or non-transitory. Memory can include any of the above and/or other devices that can store information/data/programs.

In specific embodiments, the methods of delivering people and packages using the vehicles and robots discussed herein are accomplished at least through the use of an electronic control system in the delivery vehicle. In certain embodiments, the electronic control system is comprised of a delivery server having a memory storage module, a processing module, and a communication network to enable communication with and to control certain aspects of the operation of the vehicle and, in embodiments, the deployment mechanism. Some examples of such communication include opening the liftgate on the back of the vehicle to deploy the robot, determining the delivery route, and communicating with the robot for purposes of exchanging data and providing prompts over the communications network that can be wired or wireless. In certain embodiments, the data exchanged between the vehicle and the robot includes the delivery location at the address, identification information about the package or packages to be delivered to a particular address, any data collected by sensors on the vehicle regarding obstacles that may be on the ground between the vehicle and the delivery destination, and any other information or data that may be relevant to delivering the package or packages to the doorstep or to some other predetermined destination. In certain embodiments, the delivery server also communicates with the deployment mechanism for purposes of deploying and retrieving the robot.

While much of this application has been directed to the use of the robot for residential or office deliveries, the process of loading the van at the beginning of a work shift can be accomplished using the autonomous robot described herein. The robot, armed with a lookup table and a scanner, for example, can "pick" marked packages from shelves and place them in the van for delivery.

While various illustrative embodiments incorporating the principles of the present teachings have been disclosed, the present teachings are not limited to the disclosed embodiments. Instead, this application is intended to cover any variations, uses, or adaptations of the present teachings and use its general principles. Further, this application is intended to cover such departures from the present disclosure as come within known or customary practice in the art to which these teachings pertain.

We claim:

1. A method for delivering one or more items associated with one or more delivery locations, each delivery location associated with an address, the method comprising:
    providing an autonomous vehicle comprising: a deployment mechanism, and deployable autonomous delivery robot, wherein the autonomous delivery robot comprises legs and arms;
    determining by an autonomous system, a delivery route for the autonomous vehicle based on the addresses of the delivery locations;
    navigating by the autonomous system, the autonomous vehicle to a first address on the delivery route, the first address being associated with one or more items;
    deploying the autonomous delivery robot by the deployment mechanism, wherein the autonomous delivery robot is configured for delivering the one or more items by:
        removing the one or more items associated with the first address from the autonomous vehicle by the autonomous delivery robot;
        identifying by the autonomous system the delivery location;
        carrying the one or more items to the delivery location, and placing the one or more items at the delivery location, wherein carrying and placing is by the arms of the autonomous delivery robot;
        returning to the autonomous vehicle; and
        stowing, by the deployment mechanism, the autonomous delivery robot onboard the autonomous vehicle.

2. The method of claim 1, further comprising communicating delivery location data to the autonomous delivery robot, the delivery location data comprising at least one of sensor data and stored data.

3. The method of claim 1, further comprising repeating the navigating, removing, delivering and returning steps until all items are delivered.

4. The method of claim 3, further comprising navigating the autonomous vehicle to an idling location to await further instruction.

5. The method of claim 1, further comprising the autonomous delivery robot retrieving a package from a retrieval location at an address.

6. The method of claim 1, further comprising receiving one or more requests to pick up one or more additional items at one or more additional locations and determining whether the requests can be accommodated efficiently.

7. The method of claim 6, further comprising revising the delivery route to incorporate picking up the one or more additional items.

8. The method of claim 1, wherein the deployment mechanism comprises: an assembly comprising:
a base portion mounted to the autonomous vehicle;
one or more extendable members coupled to the base portion for receiving the legged autonomous delivery robot, the one or more extendable members horizontally movable between a retracted position and an extended position;
one or more of a sensor and a communication link disposed on the assembly for communicating with the legged autonomous delivery robot and the autonomous vehicle; and
at least one securement feature disposed on the one or more extendable members for releasably securing the legged autonomous delivery robot.

9. The method of claim 1, wherein the autonomous delivery robot is a bi-pedal robot.

10. The method of claim 9, wherein the bipedal robot is configured for walking.

11. The method of claim 1, wherein deploying the autonomous delivery robot further comprises:
opening a lift gate of the autonomous vehicle;
extending an extendable member of a deployment mechanism, wherein the deployment mechanism releasably secures the autonomous delivery robot;
positioning the extendable members and the autonomous delivery robot outside of the autonomous vehicle, wherein the legs of the autonomous delivery robot extend and push against a ground surface to disengage from the extendable members, to deploy the autonomous delivery robot.

12. The method of claim 1, wherein the delivery locations comprise one or more of a doorstep of building and a predetermined delivery location.

13. The method of claim 1, wherein the delivery locations further comprise addresses for the pickup and dropoff of human travellers.

14. The method of claim 13, wherein addresses associated with the pickup and dropoff of human travellers are prioritized over the addresses associated with the delivery of items when determining the delivery route.

15. The method of claim 1, wherein a plurality of deployable autonomous delivery robots are provided and are deployed simultaneously.

16. A method for autonomously picking up or delivering one or more items or passengers to waypoint destinations, each waypoint destination associated with an address, the method comprising:
providing an autonomous vehicle comprising:
a deployment mechanism, a deployable autonomous delivery robot comprising legs and arms configured for walking and carrying, a storage area, and a passenger section;
determining by an autonomous system, a route for the autonomous vehicle based on the addresses of the waypoint destinations;
navigating by the autonomous system, the autonomous vehicle to a first address on the route, the first address being associated with a first item or passenger pickup or dropoff;
allowing, by the autonomous vehicle, the passenger to board or exit the vehicle in response to determining the address is associated with a passenger; and
deploying the autonomous delivery robot by the deployment mechanism, and delivering or picking up the item from the waypoint destination in response to determining the address is associated with an item, wherein the delivering or picking up of the item comprises the autonomous delivery robot walking and carrying the item to or from the waypoint destination.

17. An autonomous system that delivers or picks up one or more packages from one or more delivery or pick-up locations, each location associated with a street address, with an autonomous vehicle having a deployable legged delivery robot disposed on a deployment mechanism, the system comprising:
a processing module, a memory storage module, and a communication network;
the memory storage module being configured to receive and store a plurality of delivery data, the delivery data comprising one or more of delivery locations, addresses, identification of packages; and
the processing module in data communication with an electronic memory over the communication network, the processing module configured to:
determine a delivery route for the autonomous vehicle;
navigate the autonomous vehicle to a delivery destination on the delivery route;
send a signal to one or more of the legged delivery robot and the deployment mechanism to deploy from the autonomous vehicle if a routing delivery location is associated with the delivery or pickup of the one or more packages, wherein the deployment mechanism comprises an assembly comprising one or more of a sensor and a communication link disposed on the assembly and the communication link communicates the signal to one or more of the legged delivery robot and the autonomous vehicle; and
at least one securement feature disposed on one or more extendable members, wherein the securement feature releasably secures the legged delivery robot.

18. The autonomous system of claim 17, wherein the sensors are further configured to provide a local map and real-time information about obstacles that may be encountered by the legged delivery robot between the vehicle and the delivery location.

19. The method of claim 17, wherein the deployable legged delivery robot further comprises arms configured for carrying and placing items for delivery.

20. A method for transporting an item from a delivery vehicle to an intended destination with an autonomous legged robot comprising:
identifying by a autonomous system the item to be delivered;
deploying, by the autonomous system, the autonomous legged robot from the autonomous delivery vehicle; wherein deploying comprises:
opening a lift gate of the autonomous delivery vehicle by the autonomous system; extending extendable members of a deployment mechanism by the autonomous system, wherein the deployment mechanism releasably secures the autonomous legged robot;
positioning, by the autonomous system, the extendable members and the autonomous legged robot outside of the autonomous delivery vehicle, wherein the legs of the autonomous legged robot extend and push against a ground surface to disengage from the extendable members, to deploy the autonomous legged robot;

determining, by the autonomous system, a route from the autonomous delivery vehicle to the intended destination;

picking up and carrying the item to the intended destination by the autonomous legged robot; and placing the item at the intended Destination by the autonomous legged robot.

21. The method of claim 20, wherein the autonomous legged robot further comprises a pair of arms configured for picking up, carrying and placing the item.

22. The method of claim 21, wherein the autonomous legged robot further comprises a torso.

23. A method of delivering or picking up a payload at one or more locations, the payload comprising one or more items, the method comprising:

Providing an autonomous vehicle for carrying the payload, the autonomous vehicle having a deployable autonomous delivery robot comprising legs and arms, stowed therein;

determining by an autonomous system a travel route for the autonomous vehicle based on the one or more locations;

navigating by the autonomous system, the autonomous vehicle to a first location on the delivery route, the first location being associated with a first payload;

deploying, by a deployment mechanism, the autonomous delivery robot;

delivering or picking up the first payload by the autonomous delivery robot;

recalculating by the autonomous system, the travel route based on one or more of new payload, new request, and traffic conditions; and navigating by the autonomous system, the autonomous vehicle to a next location on the travel route.

24. The method of claim 23, wherein delivering or picking up the first payload comprises deploying the autonomous delivery robot from the autonomous vehicle and one or more of carrying the payload to a predetermined spot at the location and retrieving the payload from the predetermined spot at the location.

25. The method of claim 24, further comprising stowing the autonomous delivery robot on the autonomous vehicle.

26. The method of claim 23, wherein the autonomous delivery robot is configured for walking and carrying for delivering and picking up the payload.

* * * * *